United States Patent
Rager

(10) Patent No.: US 8,777,245 B2
(45) Date of Patent: Jul. 15, 2014

(54) OPTIMIZED WALL THICKNESS TORQUE ROD

(71) Applicant: The Pullman Company, Milan, OH (US)

(72) Inventor: Christopher G. Rager, Huron, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 13/678,933

(22) Filed: Nov. 16, 2012

(65) Prior Publication Data

US 2014/0138928 A1   May 22, 2014

(51) Int. Cl.
*B62D 7/16* (2006.01)
*B60G 7/00* (2006.01)

(52) U.S. Cl.
CPC ............................ *B60G 7/001* (2013.01)
USPC .......... 280/124.149; 280/124.1; 280/124.137; 280/124.152; 280/93.511

(58) Field of Classification Search
USPC ................... 280/5.511, 93.51, 93.511, 124.1, 280/124.11, 124.13, 124.137, 124.149, 280/124.166, 124.152, 679; 403/122
See application file for complete search history.

(56) References Cited

U.S. PATENT DOCUMENTS

| | | | |
|---|---|---|---|
| 3,121,348 A | 2/1964 | Reed | |
| 4,343,560 A * | 8/1982 | Chalmers | 403/13 |
| 6,267,526 B1 * | 7/2001 | McLaughlin | 403/150 |
| 6,298,962 B1 | 10/2001 | Kato et al. | |
| 6,516,993 B2 * | 2/2003 | Dankow et al. | 228/164 |
| 6,662,423 B2 | 12/2003 | Menosky et al. | |
| 6,932,118 B2 | 8/2005 | Saha et al. | |
| 7,374,823 B2 * | 5/2008 | Maruyama et al. | 428/544 |
| 2003/0122339 A1 | 7/2003 | Drabon et al. | |
| 2006/0171775 A1 * | 8/2006 | McLaughlin et al. | 403/122 |
| 2009/0305077 A1 * | 12/2009 | Mizuguchi et al. | 428/654 |
| 2011/0025013 A1 * | 2/2011 | Kuroda | 280/124.152 |
| 2011/0227307 A1 | 9/2011 | Nataraj et al. | |
| 2012/0001397 A1 | 1/2012 | McLaughlin | |

FOREIGN PATENT DOCUMENTS

| | | |
|---|---|---|
| JP | 2006-250234 | 9/2006 |
| JP | 2008-255397 | 10/2008 |
| WO | 02/24394 | 3/2002 |

OTHER PUBLICATIONS

Search Report and Written Opinion dated Feb. 7, 2014 from corresponding PCT Application No. PCT/US2013/066327 (13 pages).

* cited by examiner

*Primary Examiner* — Ruth Ilan
*Assistant Examiner* — Darlene P Condra
(74) *Attorney, Agent, or Firm* — Harness, Dickey & Pierce, P.L.C.

(57) ABSTRACT

A torque rod assembly includes a pair of end joint assemblies with a thin wall connecting tube disposed between them. The end joint assemblies each include an eye which is friction welded to the thin wall connecting tube. The use of the thin wall connecting tube and the friction welding process allow the friction weld to be located immediately adjacent a bore extending through the eye. The eyes and the thin wall connecting tube can be cast, extruded or formed from steel, aluminum or cast iron.

15 Claims, 3 Drawing Sheets

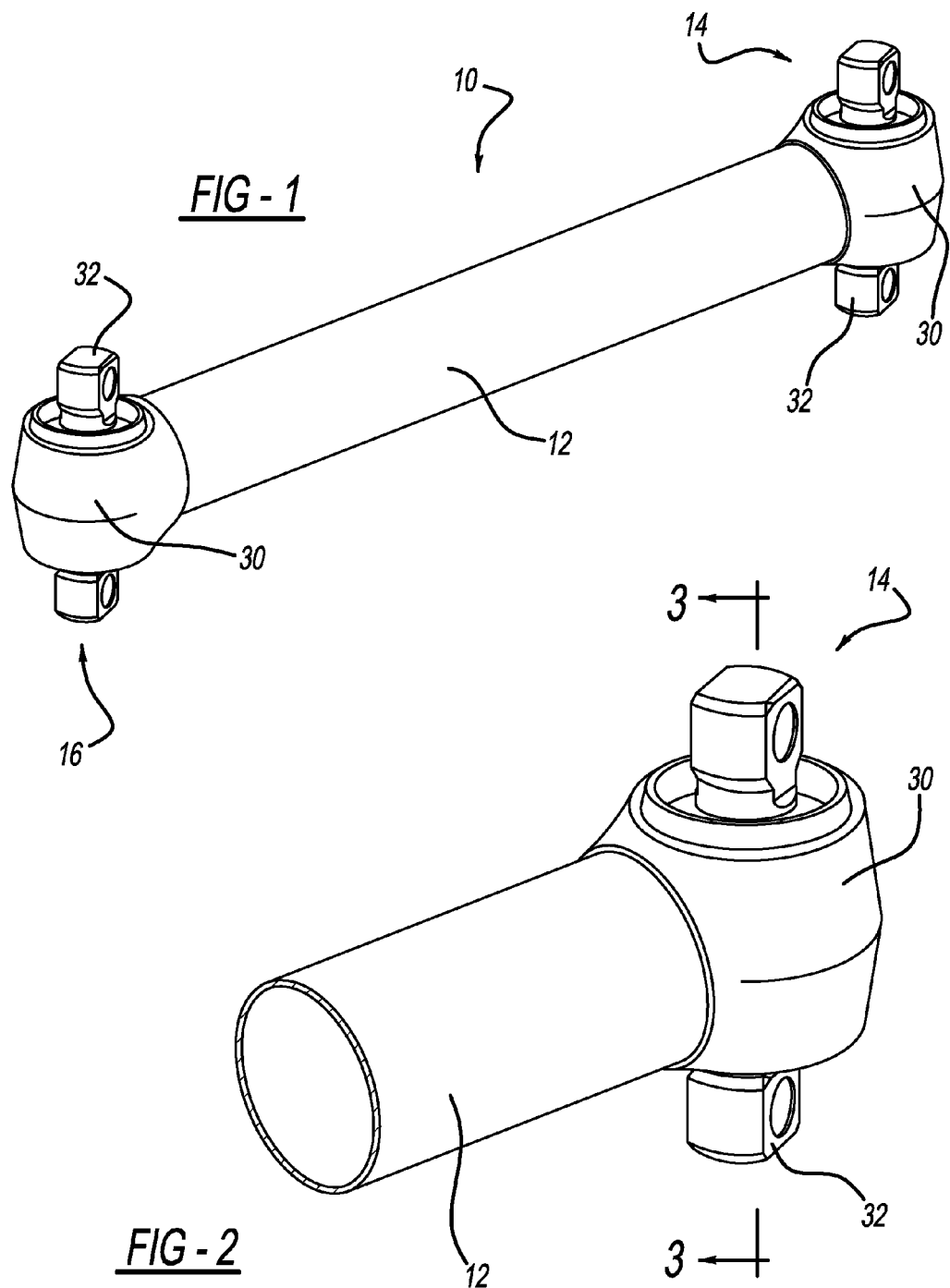

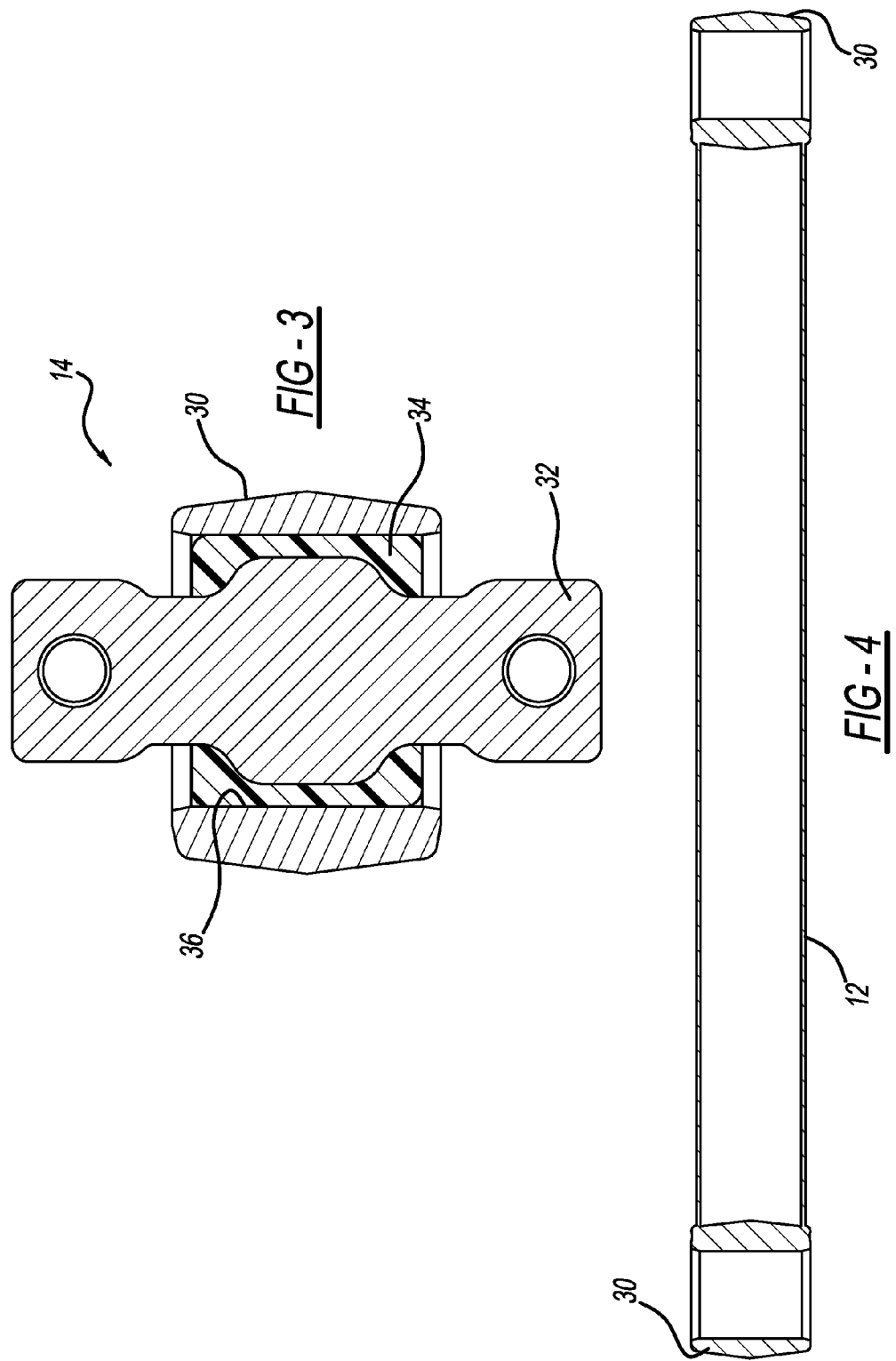

OPTIMIZED WALL THICKNESS TORQUE ROD

FIELD

The present disclosure relates to vehicle suspension rods. More particularly, the present disclosure relates to light weight vehicle suspension rods which are manufactured from components made of different materials. The individual components manufactured from different materials are joined using a welding process.

BACKGROUND

This section provides background information related to the present disclosure which is not necessarily prior art.

Vehicle suspension rods and in particular torque rod assemblies are used in the transportation industry to stabilize vehicle axles relative to a vehicle frame. A typical torque rod assembly comprises a rod or a link with connectors attached at each end. The designs for the connectors vary, but prior art designs have included ball studs, metal tubes and straddle bars. In a typical application, one end of the torque rod assembly is connected to a vehicle frame or other supporting member and the other end is connected to an axle or other component of the vehicle. The torque rod connectors usually permit rotation or pivoting of the connecting rod or link in several planes and these connectors are often isolated from shock with elastomeric bushings. The torque rod assemblies have been mounted parallel to, at an angle to or perpendicular to the vehicle axle. There are some designs where the torque rod assemblies are mounted in a transverse or "V" pattern relative to the vehicle axle. In all of the above designs, the torque rod assemblies prevent the axles or other components from rotating about their own axis, from moving for-and-aft, and from moving laterally.

Due to the severe loadings on torque rod assemblies, these assemblies have traditionally been manufactured from steel rods, steel tubing, forgings and castings. These components, once produced, are welded together using MIG, TIG or some other type of surface welding technique. The current manufacturing methods for these assemblies are costly with a large portion of the costs being associated with the machining of the raw forgings or castings in order to permit the assembly of the bushings and the connectors.

Steel stampings have been considered for this application. However, the end configurations required to support the torque rod connectors have proven to be difficult to form.

Recently, attempts have been made to manufacture torque rod assemblies using composite materials and molded polymers for the connecting rod or link. These types of torque rod assemblies have a variety of disadvantages. For example, the materials are generally not strong enough to withstand the variety of loadings to which they are subjected. In some cases, the material is not rigid enough to provide the stability required on the vehicle. Some materials are subject to impact damage, as one would expect from a gravel road. Some of the molded torque rod assemblies which have adequate strength are too bulky to fit the particular application. Finally, some molded torque rod assemblies are simply too expensive.

More recently, torque rod assemblies have been designed using a stamped steel metal reinforcement plate having a pair of flange reinforced bores located at each end of the plate. The reinforcement plate is encased within a polymer shell with the shell being of a different material than the reinforcement plate. The encasing of the reinforcement plate within the polymer shell eliminates the need for machining the ends of the torque rods as well as any need to weld the torque rods. While these torque rod assemblies have proven to be useful in some applications, due to the stamped metal plate only being a reinforcement plate, the maximum loading for these hybrid torque rod assemblies is limited.

SUMMARY

This section provides a general summary of the disclosure, and is not a comprehensive disclosure of its full scope or all of its features.

The present disclosure is directed to a vehicle suspension rod where the connectors at the ends of the vehicle suspension rod are manufactured from a cast, forged or extruded component and the thin wall connecting tube is an electric resistance welded (ERW) steel tube. Each of the connectors at the ends of the vehicle suspension rod can be manufactured from steel, aluminum, cast iron or any other material which can successfully withstand the loading requirements.

The thin wall connecting tube is friction welded to the eyes of the connectors. The use of the thin wall connecting tube and the friction welding process allows for positioning of the weld closer to the centerline of the eye of the connector. By positioning the weld close to the centerline of the eye of the connector, the length of the thin wall connecting tube is increased reducing both the costs and weight of the vehicle suspension rod.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a torque rod in accordance with the present disclosure;

FIG. 2 is a perspective view of one end of the connecting rod illustrated in FIG. 1;

FIG. 3 is a cross-sectional view of one of the end joint assemblies illustrated in FIG. 1;

FIG. 4 is a cross-sectional view of the connecting rod and the eye of the end joint assembly illustrated in FIG. 1;

Corresponding reference numerals indicate corresponding parts throughout the several views of the drawings.

DETAILED DESCRIPTION

Figure 5A:
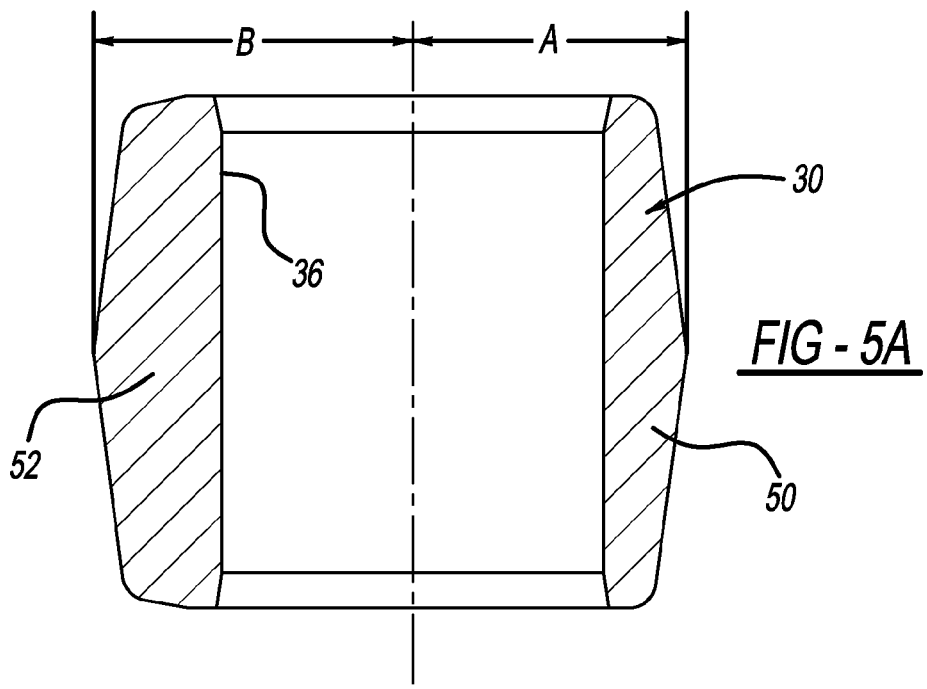
FIG. 5A is a cross-sectional view of the eye of the end joint assembly illustrated in FIG. 1.

Example embodiments will now be described more fully with reference to the accompanying drawings.

Vehicle suspension rods can include torque rods, radius rods, pivot arms, V-rods, A-frames, triangles, track bars, panhard rods, trailing links and control arm links. While the present disclosure is being described using a torque rod as an example, the present disclosure is not limited to torque rods and the present disclosure can be applicable to any of the above vehicle suspension rods or any other vehicle suspension rod.

Referring now to the drawings in which like reference numerals designate like or corresponding parts throughout several views, there is shown in FIGS. 1-3, a torque rod assembly in accordance with the present invention and which is designated generally by the reference numeral 10. Torque rod assembly 10 comprises a thin wall connecting tube 12, a first end joint assembly 14 and a second end joint assembly 16.

Referring now to FIGS. 1-4, thin wall connecting tube 12 is a circular cylindrical thin wall tubular rod which extends between first and second end joint assemblies 14 and 16. Thin wall connecting tube 12 is attached to each of the first and second end joint assemblies 14 and 16 by a friction weld using a process such as a lateral friction process or an inertia welding process for example.

End joint assembly 14 is the same as end joint assembly 16 so only end joint assembly 14 will be described. It is to be understood that the description of end joint assembly 14 applies to end joint assembly 16 also. While end joint assembly 16 is illustrated as being the same as end joint assembly 14, it is within the scope of the present disclosure that end joint assembly 16 can be different than end joint assembly 14. End joint assembly 14 includes an eye 30, a bar pin 32 and an elastomeric bushing 34 disposed between eye 30 and bar pin 32.

Eye 30 is a cast, extruded, forged or otherwise formed component that defines an internal bore 36. Bar pin 32 and elastomeric bushing 34 are disposed within internal bore 36. Eye 30 defines a face 38 which mates to the end face of thin wall connecting tube 12. The interface between the end of thin wall connecting tube 12 and face 38 of eye 30 provide for a full face weld using a friction welding process such as a lateral friction process or an inertia welding process. The full face weld means that the entire cross-sectional surface of thin wall connecting tube 12 is welded to face 38 of eye 30. This is different than the prior art MIG or TIG welding that only welds the outer surface of the cross-section of the connecting rod.

Thin wall connecting tube 12 is manufactured from a thin walled steel tube. Preferably, thin wall connecting tube is an electric resistance welded (ERW) tube to reduce costs but a more expensive drawn over mandrel (DOM) tube can be utilized. The outside diameter of thin wall connecting tube 12 will be based on the application load and the wall thickness of the thin walled steel tube will be based upon the outside diameter (OD) and the application load. When using a 2.25 inch outside diameter tube, the OD:wall thickness of the tube is preferably between 16.791:1 and 27.108:1. When using a 1.875 inch outside diameter tube, the OD:wall thickness is between 13.993:1 and 15.625:1. When using a tube which is below 1.875 inches in outside diameter the OD:wall thickness is between 13.060:1 and 14.0:1. The table below illustrates the acceptable OD:wall thickness values for a variety of thin wall connecting tubes 12.

| Outer Diameter to Wall Thickness Ratio | | | | | | | |
|---|---|---|---|---|---|---|---|
| Tube | Wall Thickness (in) | | | | | | |
| OD (in) | 0.083 | 0.095 | 0.109 | 0.12 | 0.125 | 0.134 | >0.134 |
| | Ratio OD:Wall | | | | | | |
| 1.750 | N/A | N/A | N/A | N/A | 14.000 | 13.060 | RE- |
| 1.875 | N/A | N/A | N/A | 15.625 | 15.000 | 13.993 | MOVED |
| 2.000 | N/A | N/A | 18.349 | 16.667 | 16.000 | 14.925 | FROM |
| 2.125 | N/A | 22.368 | N/A | 17.708 | 17.000 | N/A | CON- |
| 2.250 | 27.108 | 23.684 | 20.642 | 18.750 | 18.000 | 16.791 | SIDER- |
| 2.500 | 30.120 | 26.316 | 22.936 | 20.833 | 20.000 | N/A | ATION |

Thin wall connecting tube 12 can also be manufactured from a thin walled aluminum tube. The outside diameter of thin wall connecting tube 12 will be based on the application load and the wall thickness of the thin walled aluminum tube will be based upon the outside diameter (OD) and the application load. When using a 1.75 inch outside diameter aluminum tube, the OD:wall thickness of the tube is preferably 8:1 or higher.

In addition to the OD:wall thickness value, the cross-sectional area of the weld between the thin wall connecting tube 12 and eye 30 is also critical. The cross-sectional area for the weld is dependent on the outer diameter of thin wall connecting tube 12 and for steel tubes having an outside diameter of 2.25 inches and a wall thickness of 0.134 inches or less, the weld cross-sectional area should be 0.891 square inches to 0.630 square inches. For aluminum connecting tube 12, having a similar wall thickness, the weld cross-sectional area should be 1.25 square inches. The table below illustrates the acceptable weld cross-sectional areas for a variety of thin walled steel connecting tubes 12.

| Weld Cross Sectional Area | | | | | | | |
|---|---|---|---|---|---|---|---|
| | Wall Thickness (in) | | | | | | |
| Tube OD (in) | 0.083 | 0.095 | 0.109 | 0.12 | 0.125 | 0.134 | >0.134 |
| | Weld Cross Sectional Area (in$^2$) | | | | | | |
| 1.750 | N/A | N/A | N/A | N/A | 0.638 | 0.680 | RE- |
| 1.875 | N/A | N/A | N/A | 0.662 | 0.687 | 0.733 | MOVED |
| 2.000 | N/A | N/A | 0.648 | 0.709 | 0.736 | 0.786 | FROM |
| 2.125 | N/A | 0.606 | N/A | 0.756 | 0.785 | N/A | CONSID- |
| 2.250 | 0.565 | 0.643 | 0.733 | 0.803 | 0.834 | 0.891 | ERATION |
| 2.500 | 0.630 | 0.718 | 0.819 | 0.897 | 0.933 | N/A | |

Figure 5B:
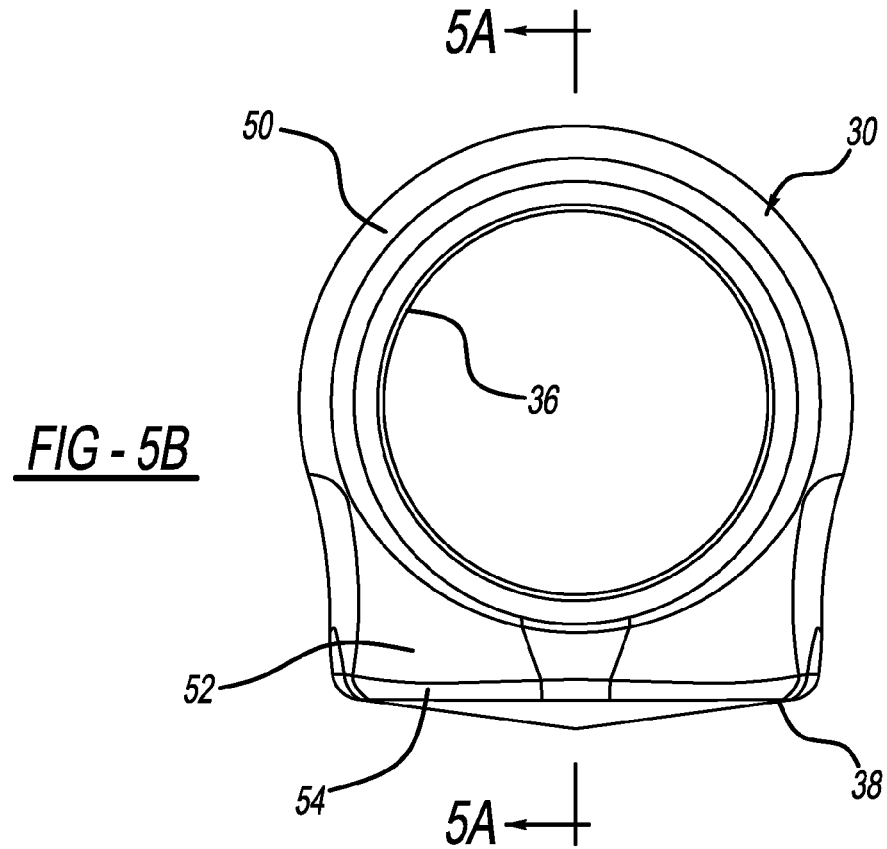
FIG. 5B is a plan view of the eye of the end joint assembly illustrated in FIG. 5A.

Referring now to FIGS. 5A and 5B, eye 30 is illustrated in greater detail. Eye 30 includes a tubular portion 50 which is designed to accept bar pin 32 and elastomeric bushing 34. An attachment neck 52 extends from tubular portion 50. Attachment neck 52 has a circular end 54 which defines face 38 and which is configured to accommodate the welding operation between neck 52 of eye 30 and thin wall connecting tube 12. Eye 30 is a cast, forged or extruded component manufactured from steel, aluminum or cast iron. As can be seen from FIGS. 5A and 5B, neck 52 adapts the tubular portion 50 into circular end 54 to enable eye 30 to mate with thin wall connecting tube 12 for the friction welding process. The use of the friction welding process allows for the shortening of neck 52 which reduces the length from the center of tubular portion 50 to the end of neck 52. This reduces both cost and weight by allowing for the increased length of thin wall connecting tube 12. Friction welding also allows for elimination of trimmings of the weld flash because the weld flash remaining after the friction welding process is not sharp and it can easily be turned to fold over out of the way as compared with other welding techniques.

As illustrated in FIG. 5A, for a typical eye 30, the friction weld between eye 30 and thin wall connecting tube 12 is immediately adjacent internal bore 36. A distance A of tubular portion 50 is 1.39 inches. A distance B of neck 52 is 1.563 inches. Thus, the friction welding of thin wall connecting tube 12 to eye 30 produces a weld that is located 0.173 inches further from the centerline of tubular portion 50 than the outside diameter of tubular portion 50. In other words, the weld is located at a distance which is a factor of 1.125 times the distance from the centerline of tubular portion 50 to the outside surface of tubular portion 50. This close proximity of the weld allows for the maximum length of thin wall connecting tube 12 to reduce both cost and weight. While FIG. 5A illustrates this ratio as 1.125, the ratio can be anywhere from 1.0 to 1.3 and preferably between 1.10 and 1.20 and still maintain the advantages of the present invention.

The assembly of torque rod assembly 10 includes providing a specified length of thin wall connecting tube 12 having a specified wall thickness and manufactured from a specified material. A pair of eyes 30 are provided having a specified configuration for open end 54 of neck 52 and manufactured from a specified material. One eye 30 is friction welded to one end of thin wall connecting tube 12 and the other eye 30 is friction welded to the opposite side of thin wall connecting tube 12. Eyes 30 can be separately welded to thin wall connecting tube 12 or eyes 30 can be simultaneously welded to thin wall connecting tube 12. After eyes 30 have been welded to thin wall connecting tube 12, bar pin 32 and elastomeric bushing 34 are assembled into tubular portion 50 of eyes 30. While the above description illustrates bar pin 32 and elastomeric bushing 34 being assembled into tubular portion 50 of eyes 30 after the welding of eyes 30 to thin wall connecting tube 12, it is within the scope of the present disclosure to first assemble bar pin 32 and elastomeric bushing 34 into tubular portion 50 of eyes 30 and then weld each end joint assembly 14 to thin wall connecting tube 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A torque rod assembly comprising:
   a first joint assembly including a first eye including a first tubular portion defining a first bore;
   a second joint assembly including a second eye including a second tubular portion defining a second bore;
   a thin wall connecting tube extending between said first joint assembly and said second joint assembly;
   a first circular weld attaching a circular end of said thin wall connecting tube to a circular end of a first attachment neck extending from the first tubular portion of said first eye of said first joint assembly, said first circular weld being disposed immediately adjacent said first bore defined by said first eye.

2. The torque rod assembly according to claim 1, wherein said thin wall connecting tube is an ERW (electric resistance welded) tube.

3. The torque rod assembly according to claim 1, wherein said first eye is an aluminum eye.

4. The torque rod assembly according to claim 1, wherein said first eye is a cast iron eye.

5. The torque rod assembly according to claim 1, wherein said first eye is a steel eye.

6. The torque rod assembly according to claim 1, wherein a ratio between a distance between a centerline of said first bore to an outer dimension of said first eye in a direction from said first joint assembly directly toward said second end joint assembly and a distance between said centerline of said first bore to said first weld in said direction from said first joint assembly directly toward said second end joint assembly is 1.0:1 to 1.3:1.

7. The torque rod assembly according to claim 1, wherein a ratio between a distance between a centerline of said first bore to an outer dimension of said first eye in a direction from said first joint assembly directly toward said second end joint assembly and a distance between said centerline of said first bore to said first weld in said direction from said first joint assembly directly toward said second end joint assembly is 1.1:1 to 1.2:1.

8. The torque rod assembly according to claim 1, wherein said thin wall connecting tube is an aluminum tube.

9. The torque rod assembly according to claim 1, wherein said thin wall connecting tube is a steel tube.

10. The torque rod assembly according to claim 1, wherein a thickness of said thin wall connecting tube is 0.083 inches to 0.134 inches.

11. The torque rod assembly according to claim 1, wherein a cross-sectional area of said first weld is 0.565 square inches to 0.933 square inches.

12. The torque rod assembly according to claim 1, wherein a ratio of an outside diameter of said thin wall connecting tube to a wall thickness of said thin wall connecting tube is 14.00:1 to 27.108:1.

13. The torque rod assembly according to claim 12, wherein a cross-sectional area of said first weld is 0.565 square inches to 0.933 square inches.

14. The torque rod assembly according to claim 12, wherein a thickness of said thin wall connecting tube is 0.083 inches to 0.134 inches.

15. The torque rod assembly according to claim 1, wherein a second circular weld attaching a circular end of said thin wall connecting tube to a circular end of a second attachment neck extending from the second tubular portion of said second eye of said second joint assembly, said second circular weld being disposed immediately adjacent said second bore defined by said second eye.

* * * * *